(12) United States Patent
Ein-Gal et al.

(10) Patent No.: US 9,928,047 B2
(45) Date of Patent: Mar. 27, 2018

(54) SYSTEM AND METHOD FOR PROVIDING APPLICATION PROGRAMS TO DEVICES

(71) Applicant: Digital Turbine, Inc., Austin, TX (US)

(72) Inventors: Oren Ein-Gal, Herzlia Pituach (IL); Vincent Vu, Los Angeles, CA (US)

(73) Assignee: Digital Turbine, Inc., Austin, TX (US)

( * ) Notice: Subject to any disclaimer, the term of this patent is extended or adjusted under 35 U.S.C. 154(b) by 0 days.

(21) Appl. No.: 13/841,140

(22) Filed: Mar. 15, 2013

(65) Prior Publication Data

US 2014/0173590 A1 Jun. 19, 2014

Related U.S. Application Data

(60) Provisional application No. 61/738,992, filed on Dec. 18, 2012.

(51) Int. Cl.
*G06F 9/455* (2006.01)
*G06F 9/445* (2018.01)

(52) U.S. Cl.
CPC ............ *G06F 8/61* (2013.01); *G06F 9/45558* (2013.01)

(58) Field of Classification Search
USPC ........................................................ 717/178
See application file for complete search history.

(56) References Cited

U.S. PATENT DOCUMENTS

| | | |
|---|---|---|
| 6,138,009 A | 10/2000 | Birgerson |
| 6,622,017 B1 | 9/2003 | Hoffman |
| 6,941,453 B2 | 9/2005 | Rao |
| 6,976,253 B1 | 12/2005 | Wierman et al. |
| 7,054,900 B1 | 5/2006 | Goldston |
| 7,184,759 B2 | 2/2007 | Date et al. |
| 7,555,750 B1 | 6/2009 | Lilley |
| 7,583,960 B2 | 9/2009 | Wierman et al. |
| 7,657,884 B2 | 2/2010 | Okonnen et al. |
| 7,698,302 B2 | 4/2010 | Wendelrup |
| 7,739,486 B2 | 6/2010 | Rao |
| 7,756,880 B2 | 7/2010 | Sighart et al. |
| 7,904,895 B1 | 3/2011 | Cassapakis et al. |

(Continued)

FOREIGN PATENT DOCUMENTS

WO WO 2014/100287 6/2014

OTHER PUBLICATIONS

International Search Report and Written Opinion in PCT/US13/76306, International Searching Authority, Alexandria, VA, dated May 20, 2014.

(Continued)

*Primary Examiner* — Hang Pan

(57) ABSTRACT

A system and method are provided for installing applications on a mobile device at first device initialization. An installation client communicates with a management server at an initial start-up state of a mobile device. The management server identifies a set of applications that are available for installation on the client device, and provides the installation files to the device. This initialization-installation of application programs allows the user to have the experience of having access to pre-installed applications at device initialization, while allowing application providers and mobile network operators real-time management of application programs being offered, without requiring pre-installing a bundle of applications on a device prior to device distribution.

15 Claims, 7 Drawing Sheets

(56) References Cited

U.S. PATENT DOCUMENTS

| | | | |
|---|---|---|---|
| 7,958,118 | B2 | 6/2011 | Eggink et al. |
| 8,046,753 | B1 | 10/2011 | Qumei |
| 8,073,937 | B2 | 12/2011 | Martinent et al. |
| 8,095,153 | B2 | 1/2012 | Jenkins et al. |
| 8,180,688 | B1 | 5/2012 | Velummylum et al. |
| 8,185,096 | B2 | 5/2012 | Smith et al. |
| 8,213,921 | B2 | 7/2012 | Chen et al. |
| 8,214,471 | B2 | 7/2012 | Doshi et al. |
| 8,225,082 | B2 | 7/2012 | Hans et al. |
| 8,233,893 | B2 | 7/2012 | Chen |
| 8,250,566 | B2 | 8/2012 | Zusman |
| 8,340,796 | B2 | 12/2012 | Stefik |
| 8,364,137 | B2 | 1/2013 | Chen et al. |
| 8,365,162 | B2 | 1/2013 | Rauma |
| 8,392,282 | B2 | 3/2013 | Nagasaka et al. |
| 8,417,263 | B2 | 4/2013 | Jenkins et al. |
| 8,463,884 | B2 | 6/2013 | Clinton et al. |
| 8,484,633 | B2 | 7/2013 | Kim |
| 8,515,409 | B2 | 8/2013 | Ramo et al. |
| 8,527,613 | B2 | 9/2013 | Malone et al. |
| 8,539,359 | B2 | 9/2013 | Rapaport et al. |
| 8,539,471 | B2 | 9/2013 | Morton |
| 8,548,876 | B1 | 10/2013 | Fox et al. |
| 8,555,273 | B1 | 10/2013 | Chia et al. |
| 8,560,486 | B2 | 10/2013 | Leo et al. |
| 8,577,398 | B2 | 11/2013 | Dudley et al. |
| 8,612,967 | B1 | 12/2013 | Delker |
| 8,666,525 | B2 | 3/2014 | Stefik |
| 8,688,699 | B2 | 4/2014 | Eggink et al. |
| 8,688,805 | B2 | 4/2014 | Swanburg et al. |
| 8,694,666 | B2 | 4/2014 | Dixon |
| 8,707,288 | B2 | 4/2014 | Roseborough |
| 8,725,180 | B2 | 5/2014 | Lee et al. |
| 8,745,613 | B2 | 6/2014 | Bambach et al. |
| 8,762,521 | B2 | 6/2014 | Cudd et al. |
| 8,793,031 | B2 | 7/2014 | Anantha et al. |
| 2003/0028884 | A1 | 2/2003 | Swart et al. |
| 2004/0224674 | A1 | 11/2004 | O'Farrell et al. |
| 2006/0031529 | A1* | 2/2006 | Keith, Jr. ............. 709/227 |
| 2006/0080261 | A1* | 4/2006 | Christal ............ G06Q 30/06 705/52 |
| 2007/0118507 | A1* | 5/2007 | Bruner ................ G06F 8/65 |
| 2007/0255576 | A1* | 11/2007 | Patterson ................. 705/1 |
| 2007/0269787 | A1 | 11/2007 | Constrom |
| 2008/0133601 | A1 | 6/2008 | Cervera et al. |
| 2008/0139112 | A1 | 6/2008 | Sampath et al. |
| 2008/0215490 | A1 | 9/2008 | Howard et al. |
| 2009/0144538 | A1 | 6/2009 | Duda et al. |
| 2009/0163183 | A1 | 6/2009 | O'Donoghue et al. |
| 2009/0319848 | A1* | 12/2009 | Thaper ................ G06F 8/64 714/748 |
| 2010/0088696 | A1 | 4/2010 | Stoev et al. |
| 2010/0165938 | A1 | 7/2010 | Kuhn et al. |
| 2010/0169153 | A1 | 7/2010 | Hwacinski et al. |
| 2010/0233996 | A1* | 9/2010 | Herz et al. ............. 455/411 |
| 2010/0241507 | A1 | 9/2010 | Quinn |
| 2010/0280892 | A1 | 11/2010 | Uzunalioglu et al. |
| 2011/0125783 | A1 | 5/2011 | Whale et al. |
| 2011/0185354 | A1 | 7/2011 | Tanner et al. |
| 2011/0199322 | A1 | 8/2011 | Langlois et al. |
| 2011/0238608 | A1 | 9/2011 | Sathish |
| 2011/0250872 | A1 | 10/2011 | Kim et al. |
| 2011/0307354 | A1 | 12/2011 | Erman et al. |
| 2012/0064820 | A1 | 3/2012 | Bemmel |
| 2012/0077470 | A1 | 3/2012 | Kim et al. |
| 2012/0102477 | A1 | 4/2012 | Kim et al. |
| 2012/0110565 | A1 | 5/2012 | O'Sullivan et al. |
| 2012/0123865 | A1 | 5/2012 | Salzano |
| 2012/0129496 | A1 | 5/2012 | Park et al. |
| 2012/0144384 | A1 | 6/2012 | Baek |
| 2012/0246302 | A1 | 9/2012 | Lafleur et al. |
| 2012/0290584 | A1 | 11/2012 | De Bona et al. |
| 2012/0324052 | A1 | 12/2012 | Paleja et al. |
| 2012/0331137 | A1 | 12/2012 | Olsen et al. |
| 2013/0047123 | A1 | 2/2013 | May et al. |
| 2013/0085851 | A1 | 4/2013 | Pedro et al. |
| 2013/0139163 | A1 | 5/2013 | Nagasaka et al. |
| 2013/0157637 | A1 | 6/2013 | Bos |
| 2013/0167143 | A1 | 6/2013 | Yi |
| 2013/0262846 | A1 | 10/2013 | Peterson et al. |
| 2013/0263018 | A1 | 10/2013 | Xiong et al. |
| 2013/0278710 | A1 | 10/2013 | Mock |
| 2013/0317910 | A1 | 11/2013 | Mohamed |
| 2013/0346194 | A1 | 12/2013 | Adderton |
| 2013/0346840 | A1 | 12/2013 | Adderton |
| 2013/0346919 | A1 | 12/2013 | Adderton |
| 2014/0089967 | A1 | 3/2014 | Mandalia et al. |
| 2014/0344804 | A1 | 11/2014 | Ein-Gal et al. |

OTHER PUBLICATIONS

Final Office Action issued in copending U.S. Appl. No. 14/541,428, dated Jan. 7, 2015, 15 pages.

Office Action issued in copending U.S. Appl. No. 14/451,428, dated Sep. 15, 2014, 17 pages.

Office Action issued in copending U.S. Appl. No. 14/451,428, dated Sep. 2, 2015, 15 pages.

Office Action issued in U.S. Appl. No. 13/654,386 dated Jul. 14, 2014.

Office Action issued in U.S. Appl. No. 13/654,386 dated May 14, 2015.

Office Action issued in U.S. Appl. No. 13/654,386 dated Mar. 24, 2016.

Office Action issued in U.S. Appl. No. 13/654,389 dated Apr. 8, 2014.

Office Action issued in U.S. Appl. No. 13/654,395 dated Jan. 7, 2015.

Office Action issued in U.S. Appl. No. 13/654,395 dated Oct. 5, 2015.

Office Action issued in U.S. Appl. No. 14/451,428 dated May 10, 2016.

Applicant-Initiated Interview Summary dated Nov. 2, 2015 from the US Patent and Trademark Office Re. U.S. Appl. No. 14/451,428. (3 Pages).

Applicant-Initiated Interview Summary dated Dec. 16, 2014 from the US Patent and Trademark Office Re. U.S. Appl. No. 14/451,428. (3 Pages).

Applicant-Initiated Interview Summary dated Jan. 19, 2017 from the US Patent and Trademark Office Re. U.S. Appl. No. 14/451,428. (3 Pages).

Official Action dated May 10, 2016 from the US Patent and Trademark Office Re. U.S. Appl. No. 14/451,428. (30 Pages).

International Preliminary Report on Patentability dated Jun. 23, 2015 from the International Bureau of WIPO Re. Application No. PCT/US2013/076306. (5 Pages).

Advisory Action Before the Filing of an Appeal Brief dated Aug. 4, 2017 from the US Patent and Trademark Office Re. U.S. Appl. No. 14/451,428. (4 Pages).

Applicant-Initiated Interview Summary dated Jun. 13, 2017 from the US Patent and Trademark Office Re. U.S. Appl. No. 14/451,428. (3 Pages).

Official Action dated May 9, 2017 from the US Patent and Trademark Office Re. U.S. Appl. No. 14/451,428. (24 pages).

* cited by examiner

FIG. 6

SYSTEM AND METHOD FOR PROVIDING APPLICATION PROGRAMS TO DEVICES

CROSS-REFERENCE TO RELATED APPLICATIONS

This application claims the benefit of U.S. Provisional Application No. 61/738,992, entitled "SYSTEM AND METHOD FOR PROVIDING APPLICATION PROGRAMS TO DEVICES," filed Dec. 18, 2012.

FIELD OF THE INVENTION

The present preferred embodiments relate to application programs for computing devices, and more particularly, to a method and system for providing application programs to devices.

BACKGROUND OF THE INVENTION

Computing devices, such as handheld smartphones and tablets, are typically delivered to an end-user with certain consumer application programs installed. Many of the applications are basic utilities that provide some basic handheld functionality for a device. For example, on a mobile smartphone device, a mobile telephone interface, contacts database and interface, calendar, music player application, camera application, maps and navigation application, SMS and MMS application, and electronic mail application are pre-installed by the manufacturer. Apart from such basic utilities, mobile network operators (MNO) may have pre-installed trial or full versions of applications for the device that they wish to promote, for example, games, business tools, and other various applications.

Pre-installing applications for devices before they are delivered to the end-user provides the disadvantage of installing applications that new device owner does not desire, and may irritate and displease the owner. An application publisher may also miss the window of opportunity to pre-install applications on a device.

It is desirable to have a system for providing applications to a device while overcoming such disadvantages.

BRIEF SUMMARY OF PREFERRED EMBODIMENTS OF THE INVENTION

A preferred embodiment includes a system and method for providing applications to a computer device. The system receives a request for installation of application programs on the device, where installation includes simulating a pre-installation experience when the installations occur as part of the device's first initialization. The system determines which application programs are available for installation based on a set of installation programs, including parameters which indicate that the applications are part of a publisher's current promotion. The system provides an identification of the set of application programs to the device at the time of first device initialization, from which a user may select for completing the installation. The system receives the installation requests from the user's selections, and sends the installation data for the application programs to the device.

BRIEF DESCRIPTION OF THE DRAWINGS

Preferred embodiments of the present invention are illustrated by way of example, and not by way of limitation, in the figures of the accompanying drawings and in which like reference numerals refer to similar elements and in which:

FIG. 6 illustrates an example of an view of an interface of a management platform for providing reports for application providers to monitor installations, according to some embodiments.

DETAILED DESCRIPTION OF PREFERRED EMBODIMENTS

In the following description numerous specific details have been set forth to provide a more thorough understanding of embodiments of the present invention. It will be appreciated however, by one skilled in the art, that embodiments may be practiced without such specific details or with different implementations for such details. Additionally some well known structures have not been shown in detail to avoid unnecessarily obscuring the present embodiments.

Other and further features and advantages of the present embodiments will be apparent from the following descriptions of the various embodiments when read in conjunction with the accompanying drawings. It will be understood by one of ordinary skill in the art that the following embodiments and illustrations are provided for illustrative and exemplary purposes only, and that numerous combinations of the elements of the various embodiments of the present invention are possible. Further, certain block diagrams are not to scale and are provided to show structures in an illustrative manner. Exemplary systems and processes according to preferred embodiments are described with reference to the accompanying figures, beginning with FIG. 1.

A system and method are described for providing applications to a device by an installation system that allows a varied and selectable set of applications to be installed on the device at the time of device initialization. The system and method provides the user with the experience of having a latest set of default applications on the device at first start-up, as if they were pre-installed on the device's read-only memory (ROM) before distribution.

Figure 1:
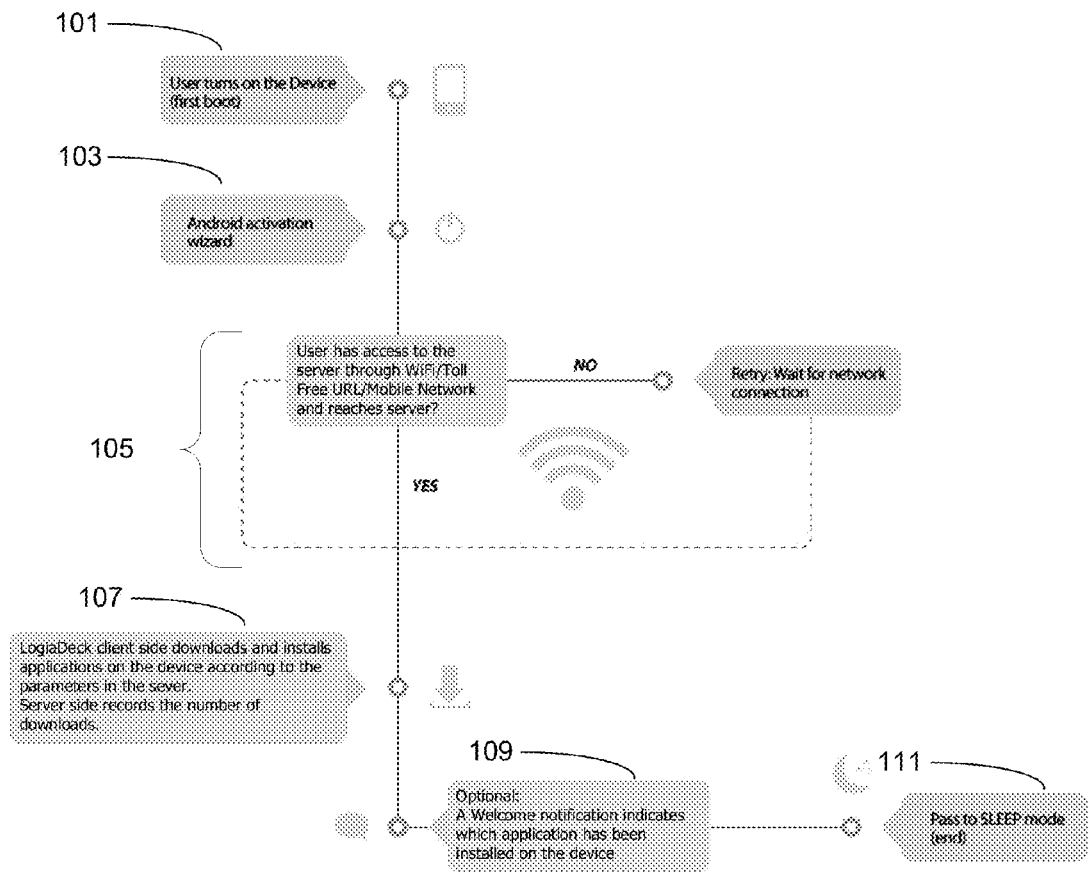
FIG. 1 illustrates a flow of operations for the installation system according to some embodiments.

FIG. 1 illustrates a flow of operations for the installation system according to some embodiments. At the initialization of the device at stage 101, a client pre-installed on a device that is part of the installation system automatically launches at stage 103. A network connection is established at stage 105. At run-time, the client communicates with an applications management server that manages the application programs intended for first installation on the devices managed. The server determines and selects the application programs to offer to the device. At stage 107, the installation system may be configured to proceed with the installation according to the parameters of the server, or it may offer some or all the applications programs for user selection via the client interface. These features enables application programs to be installed in a silent manner, or with the user's express permission. In conjunction with the downloading and installation, the server side records the download to count an aggregate number of downloads of the application from the system. At stage 109, the client optionally presents a Welcome notification indicating which application has been installed on the device.

The server receives a selection from the client interface for applications to download from among the offered applications. In some embodiments, the client interface allows a user to select the manner and method for downloading the selected applications, including whether to only download the application when the device is connected by a WiFi connection. The information is received by the server to be included for consideration among the parameter values for the application.

In some embodiments, installations may be transparent to the end user, running in the background; or approved by the user to be downloaded. The applications will be downloaded free of cost by using either WiFi or zero-rated URL. All applications can be removed/uninstalled by the user.

The client side downloads and installs the applications on the device according to the parameters in the server. A failed installation may be retried until successful installation occurs. The server side maintains a record of the data associated with the download operation, including the identity of the user, the identity of the device, the device type. The data is aggregated among all managed devices.

Update services for installed applications are available from the installation system, or from another applications provider which may provide the same application. Updates to the installation system client are also provided by the installation system.

The application programs are provided to the server by application providers, including one or more application publishers, or by an MNO. In some embodiments, the provider may be given fine control of when and how their application is offered by the server, including aspects such as limiting the number of times the application is offered to users, such as for a promotional free download of the product, or a date range for the offering. The provider may also change the application programs, or a bundle of application programs, being provided at any time. Different bundles may be offered to different devices. Such changes to the applications being offered allows for a dynamic real-time installation process for devices, allowing an up-to-the-minute window of opportunity to provide an application for the installation process. The control functions are provided to the application provider by a remote interface, for example, a web application or web browser interface.

Figure 2:
FIG. 2 illustrates an example of an interface of a management platform, according to some embodiments.
Figure 3:
FIG. 3 illustrates an example of a view of an uploading interface of a management platform, according to some embodiments.

Application providers are provided a management interface, as shown in FIG. 2, for managing the applications on the server. Management operations include providing an interface for uploading an application program, and its associated parameters, to the platform, as shown in FIG. 3. The interface allows input of the application name, browsing to the APK file for uploading, or a direct URL link to the APK file.

Figure 4:
FIG. 4 illustrates an example of a view of an interface of a management platform for setting parameters for an application program, according to some embodiments.

FIG. 4 is an example of an interface in the management system for an application provider to set parameters for an uploaded application program. In this example, parameters available for setting include:

Application Name, Application Version, and Application Package Name—these details may be extracted from the APK file for the application program, and in some cases, cannot be changed;

App Status—for setting Active or Inactive, where Active causes the application program to become available for installing on devices;

Create a shortcut in home page—determines if the application program will be presented at the home screen;

Network type—for setting availability by network type, such as from WiFi, 3G, or both;

Maximum installations allowed—for limiting a total number of devices installing the application program by the installation system; and Download period—for setting the period when the application program is available for downloading from the installation system.

Figure 5:
FIG. 5 illustrates an example of a view of an interface of a management platform for managing the parameters of more than one application in within a view, according to some embodiments.

FIG. 5 includes an example of an interface for managing the parameters of more than one application within a view.

In some embodiments, the process is repeated after the initialization of the client device to offer applications through the client interface at a later time, including for example after a factory reset when the client device is returned to a state of pre-initialization. In some embodiments, the client interface includes a pop-up overlay, or may provide a notification on the devices, to alert the user of an offer for an application at a later time after device initialization. The system may also check if the application was also already installed on the device from another application provider, and will not duplicate any installations.

Figure 6:
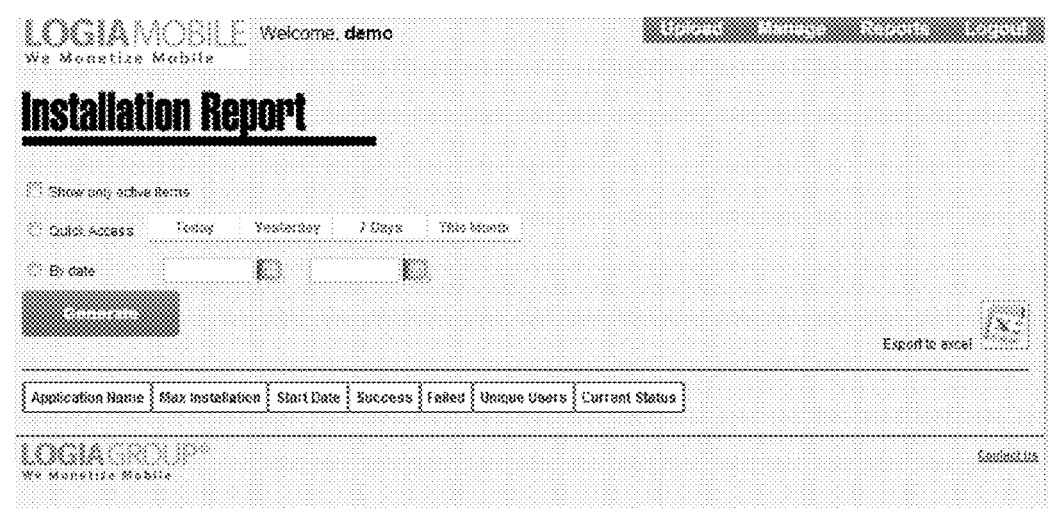

FIG. 6 is an example of an interface for providing reports for application providers to monitor installations, according to some embodiments. Management operations include full management analysis and reporting, full control on cost-per-action (CPA) deals and aggregate quantities, number of installations per application or per campaign, and information about the device (IMEI) or the user, for example, as tracked by user account or SIM card (IMSI), including which applications were successfully installed, which applications failed to install, which applications were rejected, when they were installed, and the device type.

Client devices on which the client installation program may be installed includes mobile computing devices running mobile operating systems (i.e., Android, Google Chrome OS, iOS, Windows Mobile and BlackBerry OS), and personal computer devices running operating systems such as Microsoft Windows and OS X.

Figure 7:
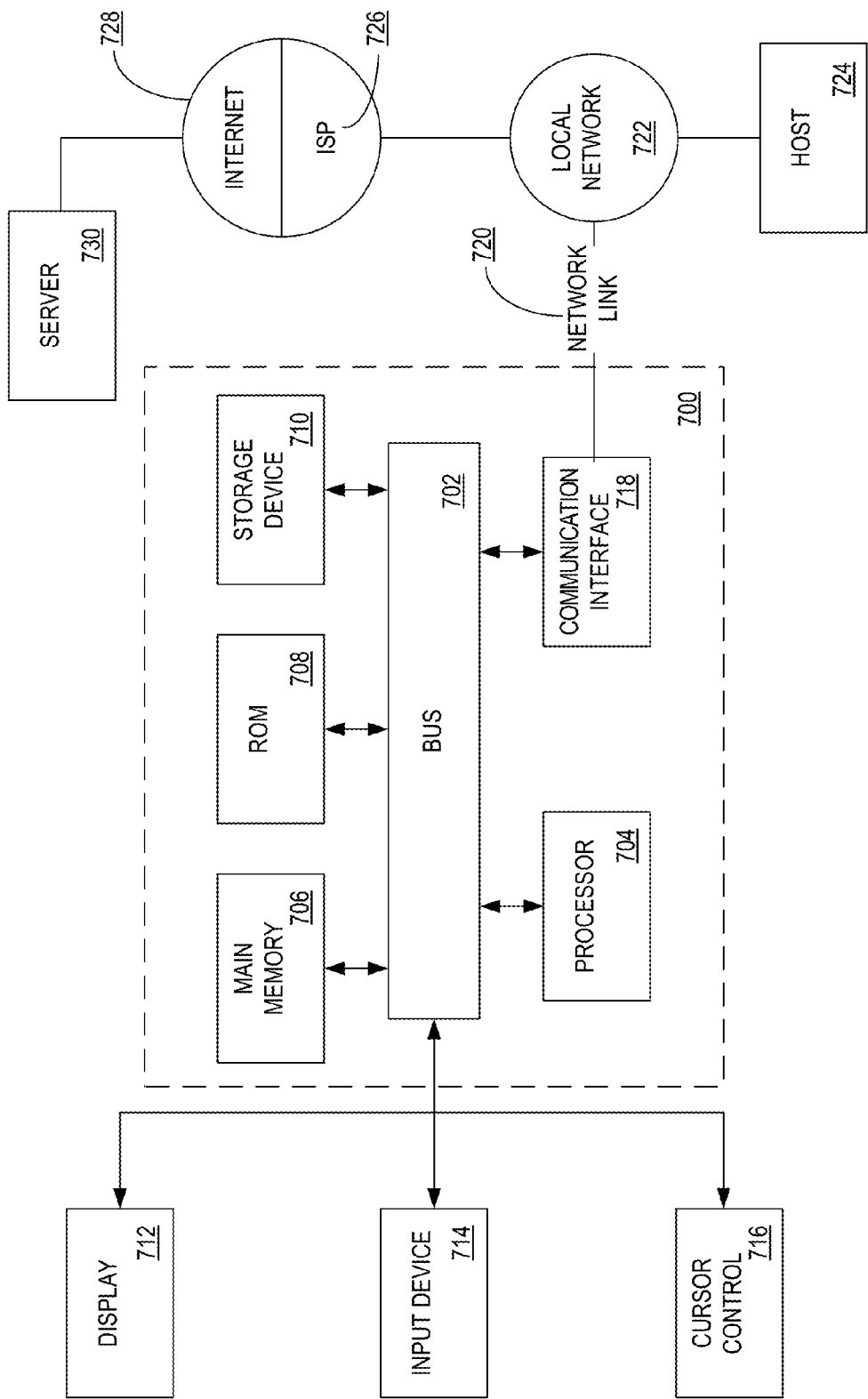
FIG. 7 illustrates an example of a computer system on which some embodiments of the invention may be implemented.

FIG. 7 is a block diagram that illustrates a computer system 700 upon which some embodiments may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk, optical disk, or a flash memory device, is provided and coupled to bus 702 for storing information and instructions.

Computer system 700 may be coupled via bus 702 to a display 712, such as a cathode ray tube (CRT) or liquid crystal display (LCD), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, input device 714 is integrated into display 712, such as a touchscreen display for communication command selection to processor 704. Another type of input device includes a video camera, a depth camera, or a 7D camera. Another type of input device includes a voice command input device, such as a microphone operatively coupled to speech interpretation module for communication command selection to processor 704.

Some embodiments are related to the use of computer system 700 for implementing the techniques described herein. According to some embodiments, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments are not limited to any specific combination of hardware circuitry and software. In further embodiments, multiple computer systems 700 are operatively coupled to implement the embodiments in a distributed system.

The terms "machine-readable medium" as used herein refer to any medium that participates in providing data that causes a machine to operate in a specific fashion. In an embodiment implemented using computer system 700, various machine-readable media are involved, for example, in providing instructions to processor 704 for execution. Such a medium may take many forms, including but not limited to storage media and transmission media. Storage media includes both non-volatile media and volatile media. Non-volatile media includes, for example, optical disks, magnetic disks, or flash memory devices, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, flash memory device, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a data transmission line using a modem. A modem local to computer system 700 can receive the data on the data transmission line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or other internet connection device, or a modem to provide a data communication connection to a corresponding type of data transmission line. As another example, communication interface 718 may be a local area network (LAN) card to provide a data communication connection to a compatible LAN. Wireless network links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the Internet 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Various additions, deletions and modifications are contemplated as being within its scope. The scope of the invention is, therefore, indicated by the appended claims rather than the foregoing description. Further, all changes which may fall within the meaning and range of equivalency of the claims and elements and features thereof are to be embraced within their scope.

What is claimed is:

1. A system for providing applications to a client computing device, the system comprising:
    an installation program stored in a client computing device that instructs a network interface of the client computing device to transmit a request over a network, the request is indicative of at least one attribute of the client computing device, wherein the installation program is installed in the client computing device before a first time boot initialization process of the client computing device and is invoked upon the first time boot initialization; and
    a server computer comprising at least one processor, adapted to:
        receive the request,
        extract the at least one attribute from the request,
        determine a set of application programs for installation on the client computing device in accordance with a match between one or more installation parameters associated with the application programs and the at least one attribute, wherein the one or more installation parameters are defined by a plurality of application providers through a management interface, wherein each application program of the set of application programs is designated for installation on the client computing device during the first time boot initialization process, and wherein each application program of the set of application programs is a new application for the client computing device, and
        send, over the network, installation data for such set of application programs to the client computing device;
    wherein in response to receiving the installation data, the installation program:
        automatically uses the installation data to start installing the set of application programs during the first time boot initialization process in a silent manner, before end user interaction is enabled, which simulates a preinstallation experience, and
        completes the first time boot initialization process.

2. The system of claim 1, wherein the client computing device is a mobile computing device.

3. The system of claim 1, wherein the one or more parameters include parameters set by an application provider for one or more of maximum downloads allowed, and date range of offering of application as available for downloading, and the steps further comprising:
    determining any one or more of:
        the initialization is not occurring while a second set of application programs is within the maximum downloads allowed, wherein each application of the second set of application programs is not offered for installation on the client computing device at the initialization of the client computing device based on said determining that the initialization is not occurring while the second set of application programs is within the maximum downloads allowed; or
        the initialization is not occurring within the date range for when the promotion campaign is active for a third set of application programs, wherein each application of the third set of application programs is not offered for installation on the client computing device at the initialization of the client computing device based on said determining that the initialization is not occurring within the date range.

4. The system of claim 1, wherein the one or more parameters include parameters set by an application provider that are associated with a date range for when a promotion campaign is active for one or more application programs, and the steps further comprising:
    determining that the initialization is not occurring within the date range for when the promotion campaign is active for a second set of application programs, wherein each application of the second set of application programs is not offered for installation on the client computing device at the initialization of the client computing device based on said determining that the initialization is not occurring within the date range.

5. The system of claim 1, wherein the server device maintains records of downloading statistics for calculating a value based on a cost per action.

6. The system of claim 1, wherein the server device maintains records of downloading statistics to track the activity of a particular client computing device.

7. The system of claim 1, wherein the server device maintains records of downloading statistics to track the activity of a particular SIM card or user account.

8. The system of claim 1, wherein one or more application programs of the set are associated with an active period for a promotion campaign, and the steps further comprising:
    determining that the initialization is not occurring within the active period for the promotion campaign for a second set of application programs, wherein each application of the second set of application programs is not offered for installation on the client computing device at the initialization of the client computing device based on said determining that the initialization is not occurring within the promotional campaign.

9. The system of claim 1, further comprising receiving an identification of a selection of application programs from the set of application programs, and sending installation data for only the selection of application programs.

10. The system of claim 1, wherein the set of application programs is provided by a plurality of application publishers.

11. A method for providing applications to a client computing device, comprising:
    generating a request message during a first time boot initialization process of a client computing device, the request message includes data indicative of at least one attribute of the client computing device;
    transmitting the request message over a network;
    extracting, by a server, the at least one attribute from the request message;
    determining, by the server, a set of application programs for installation on the client computing device in accordance with a match between one or more installation parameters associated with the application programs and the at least one attribute, wherein the one or more installation parameters are defined by a plurality of application providers through a management interface, wherein each application program of such set of application programs is designated for installation on the client computing device during the first time boot initialization process, and wherein each application program of the set of application programs is a new application for the client computing device;

providing the installation data for the set of application programs to the client computing device;

automatically using the installation data to start installing the set of application programs on the client computing device during the first time boot initialization process in a silent manner, before end user interaction is enabled, which simulates a pre-installation experience; and completing the first time boot initialization of the client computing device.

12. The method of claim 11, wherein the client computing device is a mobile computing device.

13. The method of claim 11, wherein the one or more installation parameters is set according to an application provider controlling a maximum number of times allowed for an application to be downloaded.

14. The method of claim 11, wherein the one or more installation parameters is set according to an application provider controlling a date range during which an application is offered for free download.

15. The method of claim 11 further comprising presenting to a user of the client computing device a notification indication of the set of application programs upon completion of the automatic installation.

* * * * *